J. J. Parker,
Egg-Beater.
N° 25,038.    Patented Aug. 9, 1859.
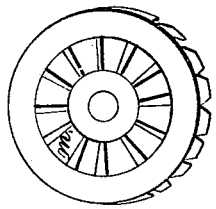
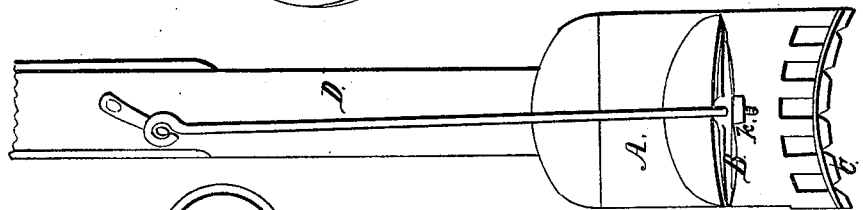
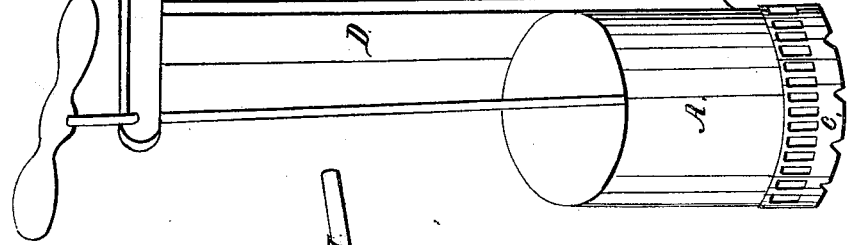
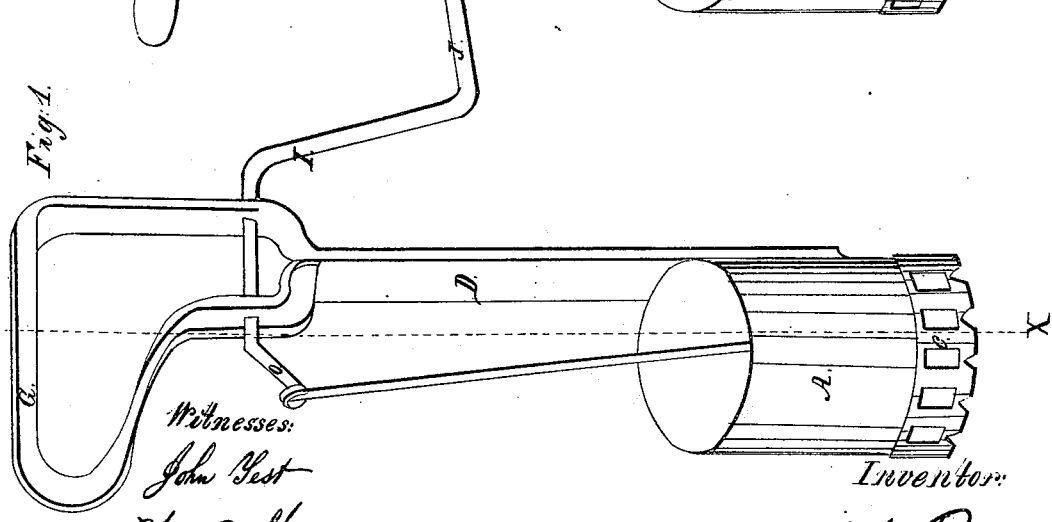
Witnesses:
John Gest
Wm. B. Mason
Inventor:
J. J. Parker

UNITED STATES PATENT OFFICE.

J. J. PARKER, OF MARIETTA, OHIO.

EGG-BEATER OR CHURN.

Specification of Letters Patent No. 25,038, dated August 9, 1859.

*To all whom it may concern:*

Be it known that I, J. J. PARKER, of the city of Marietta, county of Washington, and State of Ohio, have invented a new and useful Egg-Beater and Churn Combined; and I do hereby declare that the following is a full and clear description of the same, reference being had to the annexed drawings, making a part of this specification.

Figure 1 is a perspective view of the machine driven by a crank. Fig. 2 is a perspective view of the machine worked by a handle attached to the piston rod. Fig. 3 is a vertical section through the main body of the machine taken on the dotted line X X in Fig. 1, showing the crank, shaft, piston rod and head the openings in the tube and band. Fig. 4 is a view of the grated bottom.

This invention consists simply in making a tube of tin or any other metal, of any desired size or height with a piston head neatly fitted in it with a rod attached so as to move the piston up and down in the manner of a pump by means of a crank or handle attached to the rod. The tube is one and a half inches in diameter and one and five eighths in depth. There is an arm or post soldered to the side of the tube, the upper end of which is bent so as to form a handle or holder of any desired size or shape so as to form proper bearings for the crank shaft four inches above the tube. It may be made in the following form, by bending half an inch from line, then turning back parallel with line, extending two inches, then turned at right angles about two and a half inches, then turning again to within one inch of the two inches above mentioned, extending about one inch parallel therewith, then turned half an inch to the place of beginning and soldered firmly to the main arm or post, or it may be made by bending right the reverse. The crank shaft is made of No. 7 wire one inch long having a crank seven eighths of an inch long formed on the end with a wrist formed on it of one fourth of an inch in length to which is attached the pitman for moving the piston. At the other end a crank of two inches is formed with a handle of one and a half inches in length. This crank shaft is slipped into the bearings before the handle is soldered to the post or arm. This is the dimensions of the smaller sized machine. At the lower end of the tube is a band of about one half an inch in width loosely fitted with openings one fourth of an inch square and corresponding exactly with the openings in the tube and of the same size, so that by turning the band around either way the openings are closed or made smaller at pleasure, so as to produce more or less agitation in the eggs or cream. This band has a bottom with grate like bars cut or made in it.

The piston head may be packed with any convenient material, it being made of two oval shaped pieces of thin metal, one being fastened to the rod firmly, the other slipping loosely on against it and tightened by means of a small nut or bur on the end of the rod.

The operation of my egg beater is as follows: The eggs are broken into a vessel, the beater set into them. The piston being moved up and down by means of the crank draws the eggs in and out through the grate bars until they are completely torn in pieces or made perfectly fine and frothy.

A is the tube or main body of the beater or churn with openings at the lower end of one fourth of an inch square.

B is the piston head made of two thin pieces of metal of an oval shape with the concave edges together forming a hollow between them in which a piece of leather is inserted. By pressing them together it will be seen that the edges of the leather are forced out at pleasure.

C is a band which slips loosely over the bottom end of the tube and has openings one fourth of an inch square corresponding with the openings in the tube and also has notches cut in its lower edge. It has the rack or grate M attached.

D is the arm or post.

E is the rod attached to the pitman and moved by the crank F in Figs. 1 and 3.

G is the handle or holder.

I is the crank for turning the shaft.

J is the handle.

K is the bur or nut for tightening the piston.

M in Fig. 4 is the grated bottom.

To use my invention as a churn it has only to be enlarged to any convenient size and of sufficient strength, the cream put into a suitable vessel, the crank turned as in the case of beating eggs.

Having thus described my invention what I desire to secure by Letters Patent is—

The tube A, in combination with the band C, and grated bottom M, all constructed arranged and operating substantially in the manner described.

J. J. PARKER.

Witnesses:
 JOHN PEST,
 WILLIAM B. MASON.